United States Patent [19]

Jaccard

[11] 4,252,416
[45] Feb. 24, 1981

[54] OPTICAL INSTRUMENT FOR GATHERING AND DISTRIBUTION OF LIGHT

[75] Inventor: Pierre E. Jaccard, Bienne, Switzerland

[73] Assignee: Societe Suisse pour l'Industrie Horlogere Management Services S.A., Bienne, Switzerland

[21] Appl. No.: 954,010

[22] Filed: Oct. 23, 1978

[51] Int. Cl.³ ............................................... G02F 1/13
[52] U.S. Cl. ..................................... 350/345; 362/26
[58] Field of Search ...................... 350/345; 362/26, 31

[56] References Cited

U.S. PATENT DOCUMENTS

| 3,840,695 | 10/1974 | Fischer | 350/345 X |
| 3,864,905 | 2/1975 | Richardson | 350/345 X |
| 3,994,564 | 11/1976 | Somogyi | 350/345 |
| 4,043,636 | 8/1977 | Eberhardt et al. | 350/345 |

*Primary Examiner*—Edward S. Bauer
*Attorney, Agent, or Firm*—Griffin, Branigan & Butler

[57] ABSTRACT

An optical instrument for the gathering and distribution of light comprises a cylindrical and a planar body formed of transparent material and optically coupled together. The cylindrical body has an elliptic and circular outer surface covered with inwardly reflecting material and a light source arranged along one focal line for the elliptic surface portion. Light gathered by the cylindrical body is transmitted to the planar body and is diffused thereby over one major surface. The instrument is advantageously applied to the illumination of passive information displays such as found in liquid crystal display timepieces where efficient energy use is extremely important.

18 Claims, 9 Drawing Figures

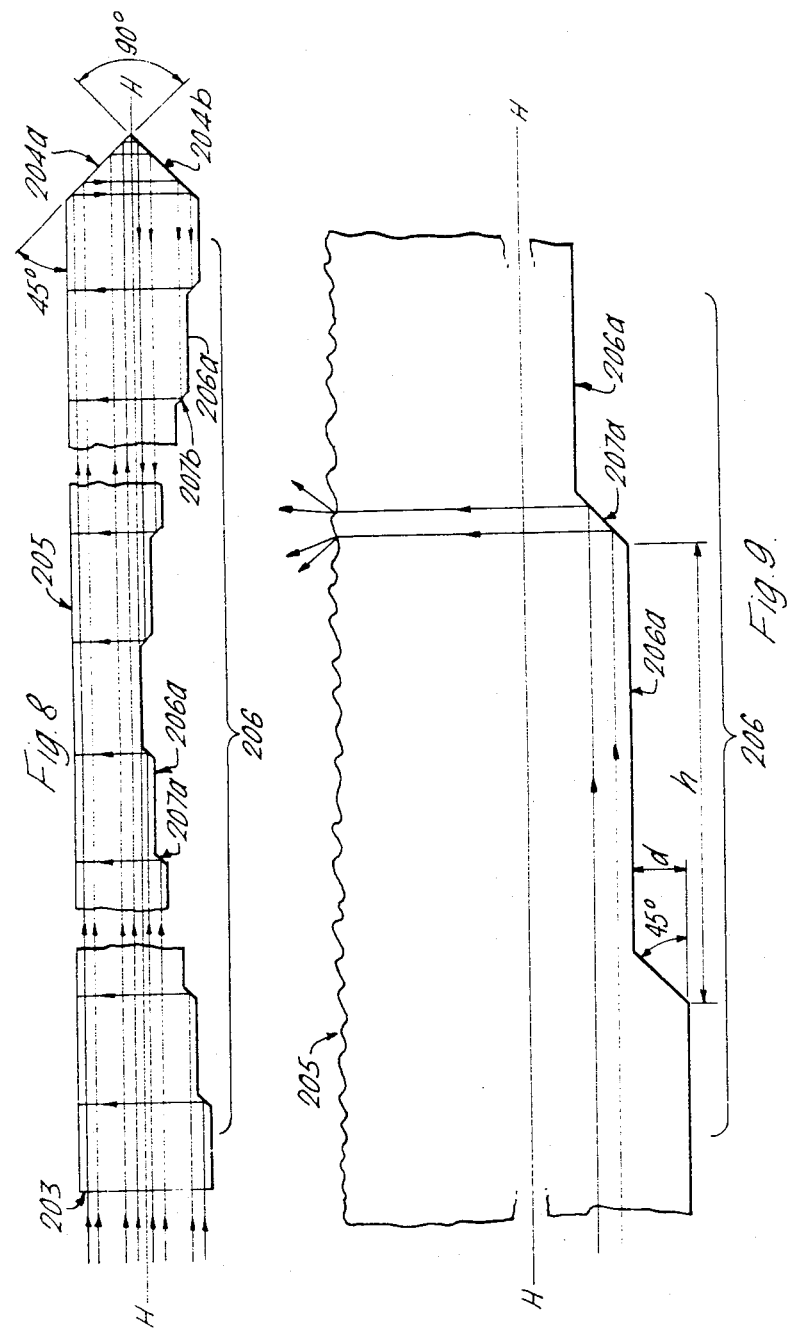

OPTICAL INSTRUMENT FOR GATHERING AND DISTRIBUTION OF LIGHT

BACKGROUND OF THE INVENTION

In the field of information displaying instruments such as timepieces, hand held calculators, vehicleboards and the like there has been a tendency in recent years to adopt passive type displays, particularly those involving the by now well-known liquid crystals. Displays of this type are passive, that is to say, they do not emit light of themselves and therefore, in darkness they become totally invisible and unreadable. To remedy this state of affairs there have been proposed types of illuminating arrangements in which for example there may be a simple incandescent lamp placed in proximity to the display, or in other known methods there has been proposed the so-called Beta light using for example tritium acting on a phosphorescent material.

In the case of small portable instruments, particularly in the case of wrist-watches it becomes essential to conserve energy and thus where a display is illuminated for instance by a lamp such as an incandescent lamp or a light emitting diode it becomes most important to assure maximum efficiency in providing the illumination to the display. This is to assure maximum life of the energy cell utilized to drive the instrument and to illuminate the display.

Known optical illuminating systems especially where used in connexion with watch displays exhibit two principal defects which the present invention seeks to remedy. Thus, known optical systems as shown schematically for example in FIGS. 1 and 2 are formed utilizing a luminous source 40 which may be for instance a microlamp having an incandescent filament, or a microtube containing tritium and giving off visible light by means of a luminescent substance or still further a light emitting diode, and of a panel 50 comprising transparent material which serves as an optical wave guide and reflector. The light source 40 is applied against an end face 51 of panel 50 or placed in an opening arranged in a portion of the latter. The known optical systems are all defective by reason of a poor optical coupling between the light source 40 and panel 50 such that the major portion of the luminous energy emitted by the source in the cylindrical sector 41 of peak S does not arrive within the panel 50 and from this fact is lost and only the portion admitted in the hached cylindrical portion 42 of peak S passes into the panel.

On the other hand the light captured by panel 50 is propagated by a total internal reflection or reflection on surfaces treated to be reflecting. If the end face 52 of panel 50 is uncovered, light such as ray $L_7$ may exit by this face, but is useless in respect of illuminating the display. Should end face 52 be covered with a reflecting layer the light may not exit from panel 50 other than by the entry surface 51. To get around this problem the major face 53 of panel 50 adjacent the display is generally treated in order to obtain a roughened surface. However, because of the type of optical coupling between source 40 and panel 50 and the mode of propagation of light within panel 50 the angles $\theta$ of internal reflection on faces 53 and 54 are large. Light may thus only exit by refraction along the non-smooth face 53 and thus tangentially in an angle $\delta$ which is limited and thus becomes useless for illuminating the display. However, a certain rather weak illumination may be obtained using only a small portion of the luminous energy which propagates within panel 50: it comprises light such as the ray $L_8$ which has run through a complex trajectory comprising an internal reflection on the non-smooth surface 53 followed by a reflection on the opposite face 54 if this is provided with a reflecting coating, or on a diffusing reflector 60 located behind face 54 if the latter is uncovered, thereafter a refraction at surface 53 which gives place to a ray $L_8'$ or $L_8''$ according to the arrangement previously indicated. The known arrangement thus provides only a small portion of the luminous energy produced by source 40, for lighting the display, the remainder of the light being lost.

The present invention provides an improved arrangement in which the major portion of the light emitted from the source is captured and diffused in a more effective manner whereby the display is better illuminated and at the same time a weaker source may be utilized thereby conserving power.

SUMMARY OF THE INVENTION

The invention therefore comprises an optical instrument for the gathering and distribution of light comprising a first body portion of transparent material in the form of an elongated cylinder the outer cylindrical surface of which is at least partially elliptic and partially circular and covered over a major portion thereof with inwardly reflecting material, a second body portion of transparent material having at least one inwardly directed light reflecting surface and a planar diffusing light transmitting surface, a light source substantially linear in form and placed along a line constituting a first focus of the ellipse whose periphery provides a portion of the profile of said cylindrical surface, and light coupling means between said first and said second body portions.

BRIEF DESCRIPTION OF THE DRAWINGS

FIG. 8 shows a further variant of the arrangement of FIG. 6, FIG. 9 shows a detail in enlarged form.

DETAILED DESCRIPTION OF THE INVENTION

Figure 3:
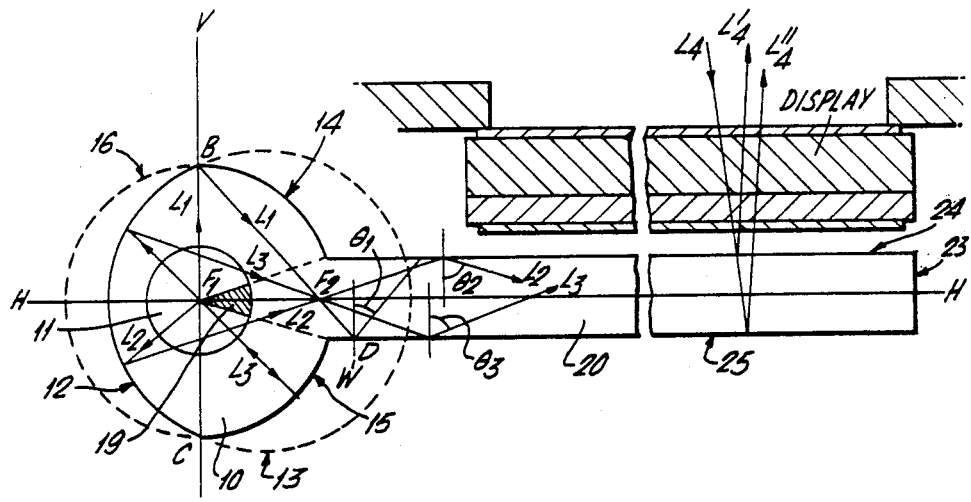
FIGS. 3 and 4 are respectively an elevation and plan view of a first embodiment of the invention.
Figure 4:
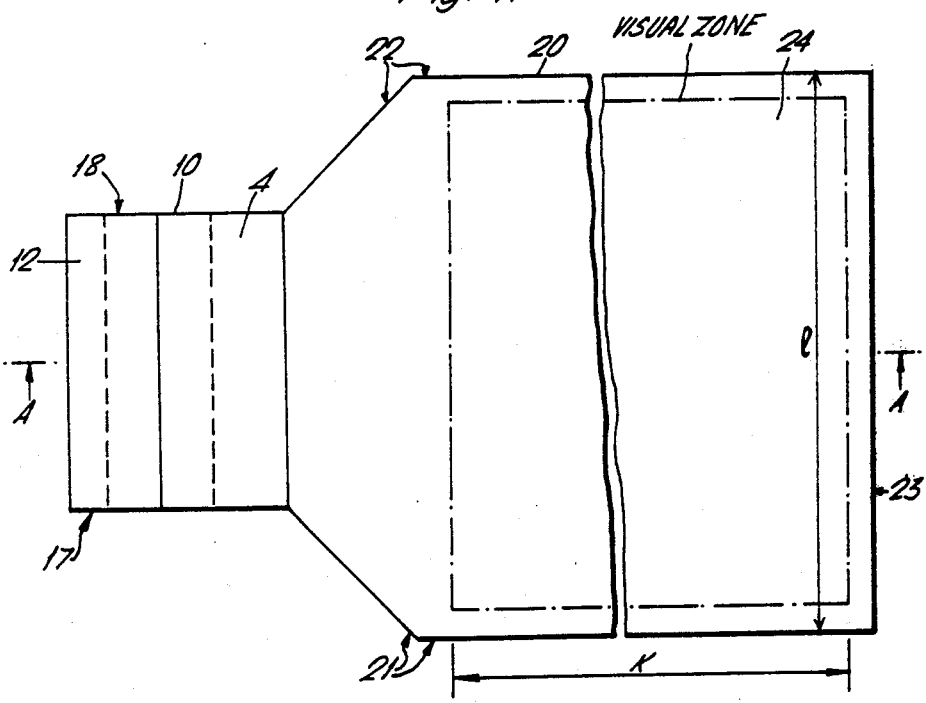

As shown in FIGS. 3 and 4 the first form of the invention is more particularly characterized by the profile of the cylindrical head 10 and by the surface structure of body 20, such head and body being integrally formed of a transparent material obtained for example through injection of an acrylic resin in a suitably formed mould.

Head 10 is provided with a cylindrical opening 11 having circular cross-section with a centre $F_1$ in order to receive the luminous source which will preferably be in the form of a microlamp having an incandescent filament. The diameter of this circular section must be adapted to that of the lamp in order that the filament thereof be well centered along the axis of the opening.

The exterior profile of head 10 comprises one portion 12 of elliptic periphery 13 with foci $F_1$ and $F_2$ and two portions 14 and 15 of circular periphery 16 the circle being centered at $F_1$. The radius of circle 16 should be equal to or greater than the dimension $F_1B$ or $F_1C$ of ellipse 13.

All surfaces of head 10 should be highly polished; that of opening 11 in order to provide a well defined optical interface between the lamp and head 10 and the exterior surfaces 12, 14, 15, 17 and 18 in order to reflect the light after having received a reflecting coating such as a layer of aluminium or silver exhibiting a coefficient of reflection equal to or greater than 0.9 for visible light. A mirror of elliptic form has the known property of producing the optical image of one focus at the other focus after reflection of light rays against the surface. This property is employed here in portion 12 of the ellipse 13; any light ray whatsoever $L_2$ coming from the filament of the lamp placed at focus $F_1$ passes through the other focus $F_2$ after reflection against the surface of elliptic form 12. The light ray $L_2$ is passed thereafter into body 20 through total reflection against the upper surface 24 and lower surface 25 with a reflection angle $\theta_2$.

The circular portions 14 and 15 of the cylindrical mirror having centre $F_1$ reflect every light ray such as $L_3$ issuing from the filament at $F_1$ according to the same direction, but in the opposed sense. Ray $L_3$ thus behaves similarly to that of $L_2$ and propagates in body 20 with a reflection angle $\theta_3$.

The limiting light ray $L_1$ propagates according to the axis V shown perpendicular to the head's plane of symmetry H—H; following reflection against 12 at point B, $L_1$ passes by focus $F_2$, arriving at point D with an angle $\theta_1$ relative to axis W parallel to axis V·$\theta_1$ is the reflection angle of the limiting light ray $L_1$ when the latter propagates into body 20. The geometric characteristics of the ellipse 13 are so chosen that $\theta_1$ is greater than or equal to $\theta_{limit}$·$\theta_{limit}$ being defined by the general relationship $$n_1 \cdot \sin \theta_{limit} = n_o$$

$n_1$ is the index of refraction of the material of the device for the light utilized and $n_o$ the index of refraction of the surrounding milieu. $\theta_{limit}$ is the minimum incidence angle which may yet produce a total reflection within the interior of the material having an index of refraction $n_1$, when the exterior medium posesses an index of refraction $n_o$ to the extent that $n_1$ is greater than $n_o$. Since generally the exterior milieu is air at normal pressure, than $n_o = 1.00$. One has thus the particular relationship $$\sin \theta_{limit} = (1/n_1)$$

For the acrylic resin Poly-Methyl Methacrylate (PMMA) $n_1 = 1,491$ from whence $\theta_{limit} = 42.12°$.

In choosing $\theta_1 = \theta_{limit}$ the dimension BC of the ellipse 13 is minimum.

One may thus determine that substantially the entire light emitted by the filament of the lamp placed at focus $F_1$ penetrates into body 20 and is propagated therein with an angle of reflection $\theta \geq \theta_{limit}$. This represents an important improvement relative to the present state of the art where only a small portion of the total light emitted by the source corresponding to the hatched section 19 of the cylindrical opening may penetrate into the diffusing portion 20 of the apparatus.

In the present case portion 12 of the ellipse 13 could be replaced by a portion of a circle constructed in a manner such that at points B and C it satisfies the condition of reflection of limiting ray $L_1$ that is to say that it produces at point D an incidence of the ray $L_1$ making an angle $\theta_1 \geq \theta_{limit}$ relative to the axis W. The light rays issuing from $F_1$ will no longer pass entirely by a single focus $F_2$ which however is not indispensable for the present embodiment. Nevertheless they penetrate entirely into body 20 and are propagated therein with an angle of reflection of $\theta \geq \theta_{limit}$ which is necessary for the present embodiment.

Body 20 has the form of a thin panel in generally rectangular shape of which the lateral faces 21 and 22 are finely polished in order to permit a total internal reflection of light. End face 23 perpendicular to the plan H—H and at the opposite end from head 10 must also be polished and moreover provided with a reflective coating as the exterior surfaces 12, 14, 15, 17 and 18 of head 10.

Figure 5:
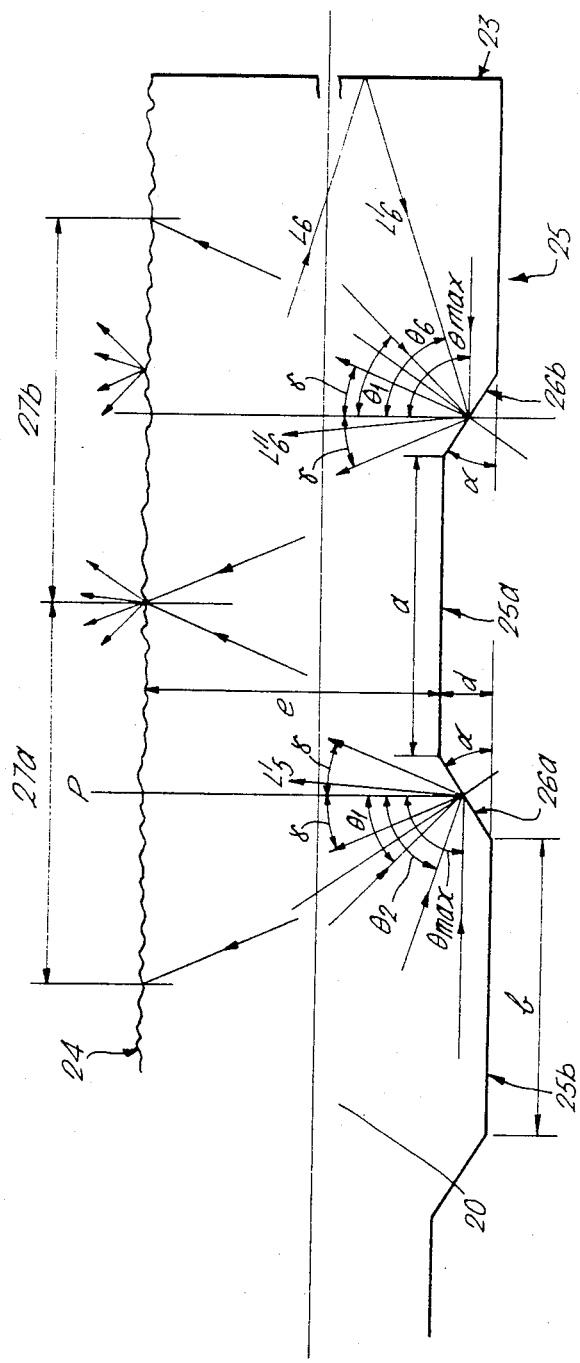
FIG. 5 shows a detail of this embodiment.

The major surface 24 of body 20 adjacent the display and parallel to plane H—H is provided with a diffusing structure represented schematically in FIG. 5 which may be limited to the zone of vision. Such diffusing structure may be of the known type already extensibly used in this type of application. Face 24 may also be provided with a coating increasing its reflectivity for visible light in order to produce a substantial reflection of ambient light such as rays $L_4$ into $L_4'$ diminishing thus the annoying effect of parallax observed in daylight when the reflection plane is displaced from the display, producing the reflection of ambient light such as $L_4$ into $L_4''$.

Major surface 25 of body 20 opposite to the display and parallel to plane H—H is provided with a special structure as shown in detail in FIG. 5 and is characterized by a sequence of planar polished faces 25a and 25b alternating regularly over the entire length K of the visual zone and separated by planar oblique polished faces 26a and 26b extending over the entire width $l$ of the body.

Figure 1:
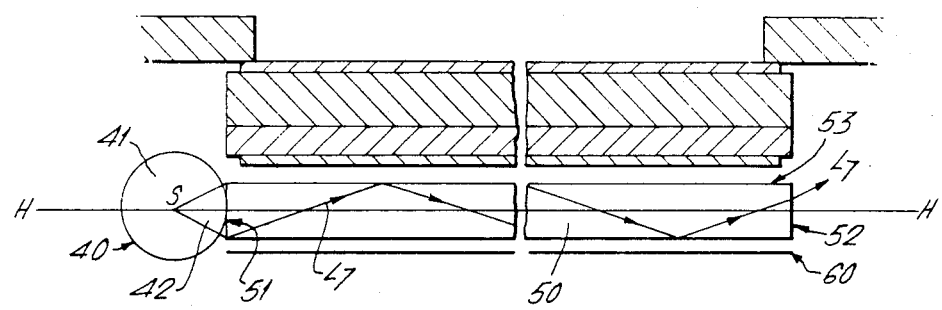
FIGS. 1 and 2 show the prior art arrangements which have been discussed already in the background of the invention portion of this disclosure.
Figure 2:
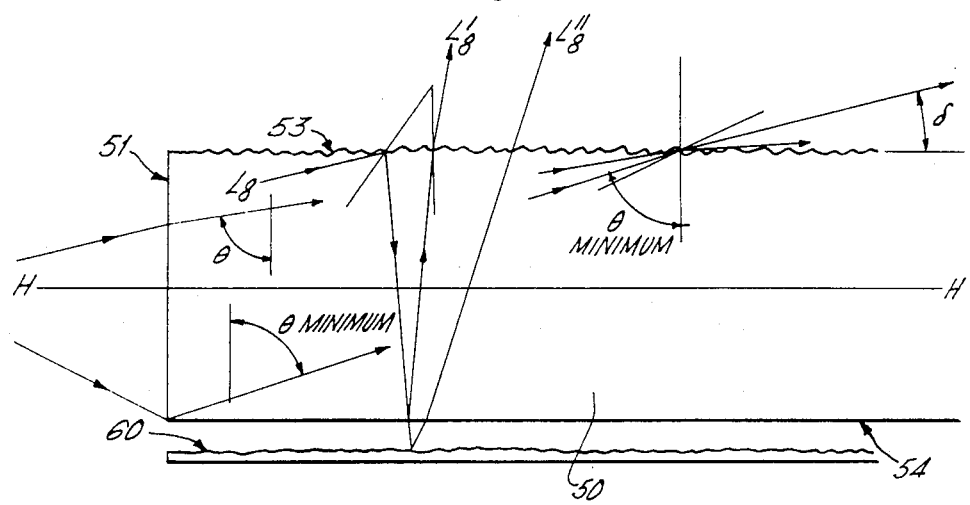

Light coming from head 10 is propagated in body 20 by total internal reflection on face 24 and the faces 25a and 25b of face 25. Only facets 26a and 26b need receive a reflective coating in order to produce the desired optical effect as described herebelow. In practice it is easier to cover entirely face 25 with a reflective coating and the coating of the end face 23 may be realized during the same operation. In order to permit the internal propagation of the light in body 20 with the minimum absorption at the reflections on faces 25a and 25b the reflective coating of face 25 should have a reflectivity as high as possible. At the same time covering entirely face 25 with a reflective coating simplifies the manufacture of the optical display system. Effectively, a separated reflector 60 as generally utilized (FIG. 2) and placed on the side 54 opposite the display may be eliminated since the assembly of planar faces 25a and 25b parallel to plane H—H fulfils the function of reflection of ambient light such as ray $L_4$ into $L_4''$ utilized in daylight reading.

The oblique polished faces 26a and 26b form an angle $\alpha$ with plane H—H. The angle $\alpha$ is calculated in a manner such that all light rays such as $L_5$ which propagate in the body by reflection on faces 24 and 25 with an incident angle $\theta_5$ and falling on a facet 26a are reflected into $L_5'$ into a cone having a summit angle $2\gamma$ symmetric relative to the perpendicular p to the plane H—H. Angle $\alpha$ is determined by the value of $\theta_1$ of the limiting ray $L_1$ in view of the relations:

$$\theta_{minimum} = \theta_1 \leq \theta_5 \leq \theta_{max} = 90°$$

One thus obtains the value of α through the relationship $$\alpha = 22,5° + (\theta_1/4)$$

When the profile of head 10 is calculated in a manner such that $\theta_1 = \theta_{limit}$ then $$\alpha = 22,5° + \theta_{limit}/4$$

For the particular application in which the material of the instrument is an acrylic resin like PMMA and the ambient matter is air ar normal pressure one may obtain thus $\alpha \simeq 33°$.

Facets 26b play a role identical to that of facets 26a, but reflect light rays such as $L_6'$ into $L_6''$ where rays are propagated in the body 20 without meeting a facet 26a and are thus subjected to a reflection on face 23 such as $L_6$ into $L_6'$.

The width a and b of the faces 25a and 25b are chosen in a manner such face 24 is lighted over its entire extent; that is to say zones 27a and 27b of face 24 illuminated respectively by the reflections of the light rays on facets 26a and 26b are at least adjacent. Distances a and b depend thus on the minimum thickness e of body 20, the depth d of facets 26a and 26b and from the angle γ. One obtains then the following relations $a \leq 2e \cdot tg\gamma$ and $b \leq 2(e+d) \cdot tg\gamma$ On the other hand the value of angle γ is given by the relationship $$\gamma = 45° - (\theta_1/2)$$

the depth d of facets 26a and 26b may be chosen according to the division of illumination desired from one extremity to the other of the length K of the visual zone. Typically, d may be chosen between 10 and 100 μm.

In a practical example the transparent material used will be the acrylic resin PMMA having $n_1 = 1.491$, the surrounding milieu will be air with $n_o = 1.000$. Choose $$\theta_1 = \theta_{limit} = 42.12°$$

minimum thickness e = 0.5 mm
depth of the facets d = 15 μm
one thus obtains the following values:
$\alpha \simeq 33°$, $\gamma = 23.94°$, $a \leq 0.444$ mm, $b \leq 0.457$ mm, It may thus be determined that the greatest portion of the light energy passed into body 20 may exit by face 24 in useful directions insofar as illumination of the display is concerned for a nighttime reading. This represents an important improvement relative to the known state of the art.

Figure 6:
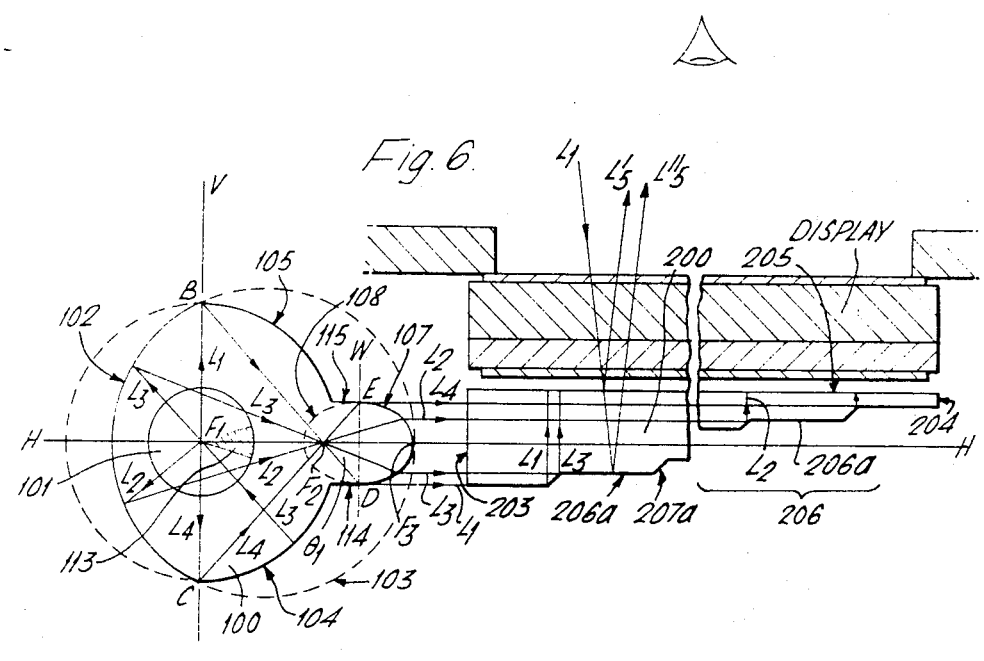
FIGS. 6 and 7 show respectively an elevation and plan view of a second embodiment of the invention.
Figure 7:
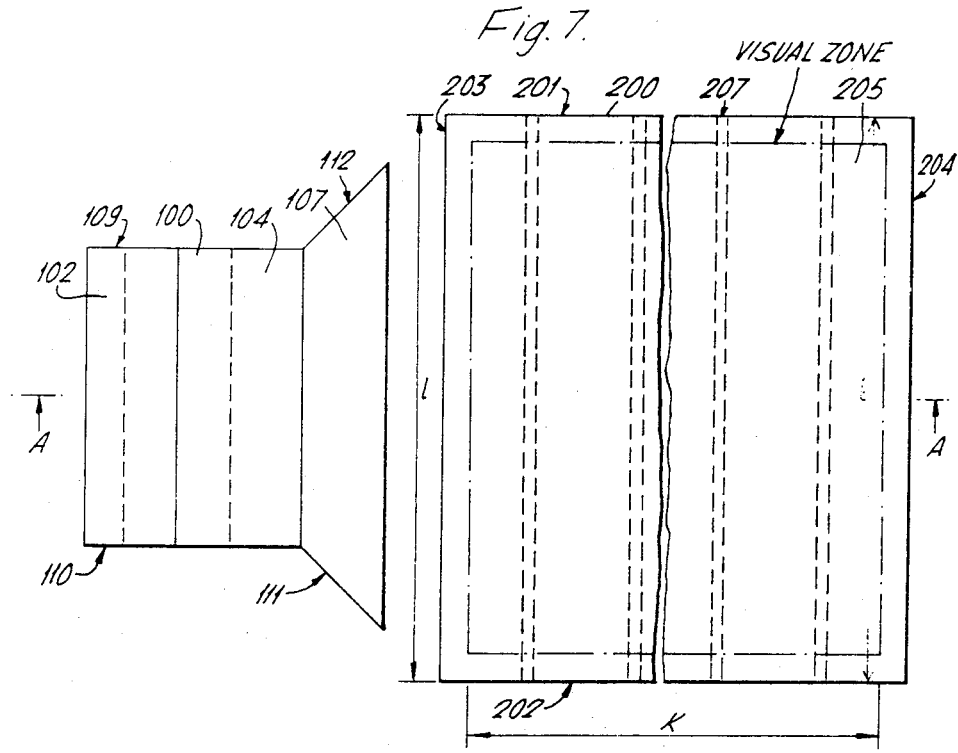

Consider now the embodiment represented in FIGS. 6 and 7. Herein the same basic lay-out is retained as in the preceding embodiment, however, instead of forming the instrument as a single piece two portions are provided of which one constitutes the head or cylindrical portion containing the light source and indicated as 100 on FIGS. 6 and 7 and the other separate portion comprises the diffusing body 200. Owing to the fact that these are now constituted as separate pieces certain differences are necessary in order to obtain the maximum possible yield and efficiency.

Thus, as in the preceding example exterior profile of head 100 is formed by a portion 102 of an ellipse 103 having foci $F_1$ and $F_2$, of two portions 104 and 105 of a circle 106 having centre $F_1$ and of a portion 107 of a further ellipse 108 having foci $F_2$ and $F_3$. As in the preceding example the radius of circle 106 centered on $F_1$ should be equal to or greater than the dimension $F_1B$ or $F_1C$ of ellipse 103. Portion 107 of ellipse 108 is joined to portions 104 and 105 of the circle 106 respectively by line segments 114 and 115 which have nothing to do with the optical functioning of the apparatus.

All surfaces of head 100 with the exception of segments 114 and 115 should be highly polished and exterior surfaces 102, 104, 105, 109, 110, 111 and 112, in order to reflect the light, should be provided with a reflecting coating which exhibits a reflection coefficient equal to or exceeding 0.9 for visible light as in the preceding case. Cylindrical opening 101 fulfils the same function in the same manner as cylindrical opening 11 in the embodiment of FIG. 3.

As in the preceding example the light originating at focus $F_1$ is propagated within the head in a similar manner that is to say the optical image of focus $F_1$ of the elliptical mirror will be obtained at the other focus $F_2$ following reflection of light rays such as $L_2$ and $L_3$ against the surface. In this embodiment the interface 107 having an elliptic section has the property of producing an optical image of focus $F_2$ at infinity following light's refraction owing to the passage from the milieu having an index $n_1$ to the milieu having an index $n_o$ with $n_1 > n_o$ where $n_1$ is the index of refraction of the material of the head for the light utilized and $n_o$ is the index of refraction of the exterior environment. This property is employed here in portion 107 of ellipse 108 and thus a light ray $L_2$ passing through focus $F_2$ is propagated parallel to the head's plane of symmetry H—H in the exterior environment following refraction across the elliptic interface 107.

It is important that portion 102 be elliptic in order to produce the image from $F_1$ in a single point $F_2$ and that portion 107 be elliptic and that its focus $F_2$ be the same as the focus $F_2$ of the first ellipse 103. In this embodiment the limiting light ray $L_1$ propagates along axis V perpendicular to plane H—H; following reflection against 102 at B, $L_1$ passes through focus $F_2$ and arrives at D with an angle $\theta_1$ relative to an axis W parallel to axis V. The intersection of ray $L_1$ with ellipse 108 at point D provides a limit to the elliptic portion 107. The geometric characteristics of ellipse 103 are chosen in a manner such that $\theta_1$ is equal to or greater than $\theta_{limit}$, $\theta_{limit}$ being defined as before:

$$n_1 \cdot \sin \theta_{limit} = n_o$$

Under the same conditions as in the preceding example $\theta_{limit} = 42.12°$. If ellipse 103 is constructed such that $\theta_1 = \theta_{limit}$ then the elliptic portion 107 becomes a half ellipse. In this embodiment the portion of the light emitted within the hatched cylindrical segment 113 is not used, but it may be diminished by prolonging the circular portions 104 and 105 of the cylindrical mirror portion to the point where these intersect limit rays $L_1$ and $L_4$ in their respective trajectories BD and CE following respective reflection at points B and C. By carefully choosing the geometric characteristics of ellipse 103 and circle 106 focus $F_2$ may be placed on the circumference of circle 106. Under such conditions the cylindrical segment 113 may theoretically be rendered infinitely small and then all light emitted by a filament placed at $F_1$ is utilizable in the special arrangement as just described.

In this embodiment also the diffusing body 200, although separated from the head 100, has a form similar to the diffusing body in the preceding example. Thus lateral faces 201 and 202 are highly polished in order to permit total internal reflection of light. Face 203 which is placed adjacent to the head and perpendicular to plane H—H is also polished to permit the entry of luminous rays coming from head 100 without causing a deviation in their course outside of a plane parallel to plane H—H. According to a first arrangement of the diffusing body as shown in FIG. 6, end face 204 remote from head 100 does not necessitate any particular surface finish while according to the arrangement represented in the variation of FIG. 8 face 204 comprises two plane bevelled facets 204a and 204b highly polished and forming each an angle of 45° relative to plane H—H and an angle of 90° between one another.

As in the preceding example the major surface 205 parallel to plane H—H is provided with a diffusing structure as shown in FIG. 9. Such surface may be provided with a coating increasing its reflectivity for visible light in order to produce greater reflection of ambient light such as ray $L_5$ into $L_5'$ diminishing thus the effect of parallax as in the previous case.

Surface 206 of the body 200 remote from the display arrangement and parallel to plane H—H exhibits a special structure shown in detail in FIG. 6 and is characterized by a series of stepped zones 206a having planar surfaces parallel to plane H—H and separated by angled facets 207a extending over the entire width $l$ of the body and forming an angle of 45° to the plane H—H.

The beam of light parallel to plane H—H coming from head 100 enters body 200 by face 203 and meets in sequence the different oblique facets 207a. If the body is made from a material for which the index of refraction for the light utilized is $n_1$, the exterior environment having an index of refraction $n_o$, and the relationship $$(n_1/n_o) > \sqrt{2}$$

is satisfied, then rays parallel to plane H—H meeting the oblique facets 207a will be subject to total internal reflection. This condition is satisfied in particular if the material of the body is the acrylic resin PMMA and the exterior environment air. Following this reflection, the light rays are prapagated in planes perpendicular to plane H—H as shown in FIGS. 6, 8 and 9, strike surface 205 to be diffused thereat and thus produce the nighttime lighting of the display.

In the first mode of realization of this embodiment for body 200 as shown in FIG. 6, the planar facets constitute a series of ascending steps, the light rays parallel to plane H—H penetrating by face 203 being directly reflected on the facets 207a. According to a second and preferred form for this embodiment as shown in FIG. 8 such oblique facets form a series of ascending steps 207a up to the middle of the length K of the visible zone then a descending series of steps 207b. A first portion of the beam parallel to plane H—H penetrates by face 203 and is reflected on the mounting steps 207a while the other portion is initially subject to two total internal reflections on the planar faces 204a and 204b producing a translation of the light's plane of propagation parallel to itself at the remote end of the structure before being reflected on the descending surface facets 207b.

It may thus be determined that all light penetrating into body 200 by face 203 parallel to plane H—H exits by face 205 in directions which are useful for illuminating the display in order to facilitate night reading thereof.

As in the preceding instance face 206 does not require to be coated in order to produce the distribution of light as described hereinabove. However, covering entirely face 206 with such a reflective coating simplifies the construction of the optical system. Effectively, a separate reflector 60 which is often used with this type of apparatus may be thus suppressed.

The depth d of the oblique facets 207a and 207b, their spacing h, and the number thereof are a matter for individual designers in respect of the desired dimensions of the overall system and need to be considered in respect of the visual aspect for daytime vision and of uniformity of lighting for nighttime vision. Typically, d will be chosen between 10 and 100 $\mu$m, h being between 0.1 and 1 mm.

What we claim is:

1. Optical instrument for the gathering and distribution of light comprising a first body portion of transparent material in the form of an elongated cylinder the outer cylindrical surface of which is at least partially elliptic and partially circular and covered over a major portion thereof with inwardly reflecting material, a second body portion of transparent material having at least one inwardly directed light reflecting surface and a planar diffusing light transmitting surface, a light source substantially linear in form and placed along a line constituting a first focus area of the elliptic surface whose periphery provides a portion of the profile of said cylindrical surface, and light coupling means between said first and said second body portions for gathering light reflected from said elliptic surface to a second focus area thereof and coupling said light to said second body portion.

2. Optical instrument as set forth in claim 1 wherein said light source is in the form of an incandescent strip lamp whose filament lies along the first focus area, said area generally forming a line, proximate the elliptical portion of the outer cylindrical surface.

3. Optical instrument as set forth in claim 2 wherein said focus line comprises the center for the circular portion of the outer cylindrical surface.

4. Optical instrument as set forth in claim 1 wherein said first and second body portions and said light coupling means are integrally fashioned to form a single element.

5. Optical instrument as set forth in claim 4 wherein said first and second body portions are united at an interface along a circular portion of the cylindrical outer surface, said interface forming said light coupling means in the vicinity of said second focus area.

6. Optical instrument as set forth in claim 5 wherein the second body portion is in the form of a generally rectangular panel, the major surfaces of which constitute the reflecting and diffusing surfaces and are parallel to the cylinder axis and wherein a plane parallel to said major surfaces contains focal lines of the elliptic portion of the cylindrical surface.

7. Optical instrument as set forth in claim 6 wherein the reflecting surface is regularly facetted over its usable extent, the facets comprising alternating projections and depressions having their major surfaces parallel to said plane and being joined by oblique planar surfaces.

8. Optical instrument as set forth in claim 1 arranged so as to distribute or diffuse light through a passive information display.

9. Optical instrument as set forth in claim 8 wherein said information display comprises an opto-electronic display incorporated into a timepiece.

10. Optical instrument as set forth in claim 9 wherein said opto-electronic display comprises a liquid crystal display.

11. Optical instrument as set forth in claim 1 wherein said first and second body portions are separated into two distinct elements, said light coupling means being provided by a second elliptic surface along said cylinder, a first focal line of which coincides with a second focus line of the first-mentioned elliptic surface and second and first focal lines of which, together with a first focus line of the first-mentioned elliptic surface lie in single planar surface whereby collimated light from said source exits from said second elliptic surface.

12. Optical instrument as set forth in claim 11 wherein the second body portion is in the form of a generally rectangular panel, the major surfaces of which constitute reflecting and diffusing surfaces and are parallel to the cylinder axis, one end surface being flat and arranged in facing proximity to said second elliptic surface whereby collimated light exiting from said second elliptic surface enters said second body portion normal to said one end surface, said reflecting surface comprising a sequence of steps having major surfaces parallel to a plane of said second body portion coplanar with said single planar surface, the major surfaces of said steps being joined by angled surfaces whereby the collimated entering light is completely reflected at 90° so as to exit from the diffusing surface.

13. Optical instrument as set forth in claim 12 wherein said steps rise from both ends of said second body portion toward the center, the end surface remote from said one end surface being bevelled so as to reflect collimated light incident thereon and thus producing a translation of the light's plane of propagation parallel to itself.

14. Optical instrument as set forth in claim 7 wherein the transparent material comprises an acrylic resin and the oblique planar surfaces are at an angle of approximately 33° to said plane.

15. Optical instrument as set forth in claim 13 wherein the transparent material comprises an acrylic resin and the angled surfaces are at an angle of approximately 45° to said plane.

16. Optical instrument as set forth in claim 12 arranged so as to distribute or diffuse light through a passive information display.

17. Optical instrument as set forth in claim 16 wherein said information display comprises an opto-electronic timepiece display.

18. Optical instrument as set forth in claim 17 wherein said opto-electronic display comprises a liquid crystal display.

* * * * *